United States Patent
Zhang

(10) Patent No.: US 7,113,382 B2
(45) Date of Patent: Sep. 26, 2006

(54) PRACTICAL PLASMA ARRESTER

(76) Inventor: Shiding Zhang, No. 7, Unit 3, Building No. 7, Ciyunsi, Chaoyang District, Beijing, 10002 (CN)

( * ) Notice: Subject to any disclaimer, the term of this patent is extended or adjusted under 35 U.S.C. 154(b) by 461 days.

(21) Appl. No.: 10/451,950

(22) PCT Filed: Dec. 27, 2001

(86) PCT No.: PCT/CN01/01649

§ 371 (c)(1),
(2), (4) Date: Jun. 27, 2003

(87) PCT Pub. No.: WO02/054550

PCT Pub. Date: Jul. 11, 2002

(65) Prior Publication Data

US 2004/0047102 A1    Mar. 11, 2004

(30) Foreign Application Priority Data

Dec. 28, 2000  (CN) .............................. 00 2 66436

(51) Int. Cl.
*H02H 3/22* (2006.01)
(52) U.S. Cl. ...................................... 361/117; 361/120
(58) Field of Classification Search ................ 361/117, 361/118, 120, 127, 212, 215
See application file for complete search history.

(56) References Cited

U.S. PATENT DOCUMENTS

| | | | |
|---|---|---|---|
| 4,652,694 A | * | 3/1987 | Goldman et al. .............. 174/3 |
| 4,755,904 A | | 7/1988 | Brick |
| 5,159,196 A | * | 10/1992 | Kolbenschlag .............. 250/310 |

FOREIGN PATENT DOCUMENTS

| | | |
|---|---|---|
| CN | 1139304 A | 1/1997 |
| CN | 2312518 Y | 3/1999 |
| EP | 0 228 984 A2 | 7/1987 |
| EP | 0228984 A2 | 7/1987 |
| JP | 7-7716 A | 1/1995 |
| JP | 7007716 A | 1/1995 |

OTHER PUBLICATIONS

CN2312518Y, Fudan University, The whole document.

* cited by examiner

*Primary Examiner*—Brian Sircus
*Assistant Examiner*—Danny Nguyen
(74) *Attorney, Agent, or Firm*—Birch, Stewart, Kolasch & Birch, LLP

(57) ABSTRACT

The present invention relates to practical plasma. Because in the plasma lightning arrester of the prior art, the intensity of the balancing charge is usually insufficient and disappear quickly, there is no sufficient time and intensity to balance out the induced charge on the surface of object to be protected, therefore the plasma lightning arrester of the prior art can not prevent the object from lightning strike effectively. The present invention appends a RC charging-discharging circuit on the passage way of balancing charge in series, so that the passing period of balancing charge is extended, and the lightning strike can be prevented effectively. The charge amplifier is arranged to intensify the balancing charge and enhance the protecting ability against lightning strike.

7 Claims, 2 Drawing Sheets

PRACTICAL PLASMA ARRESTER

This application is the national phase under 35 U.S.C. § 371 of PCT International Application No. PCT/CN01/01649 which has an International filing date of Dec. 27, 2001, which designated the United States of America.

FIELD OF THE INVENTION

The present invention relates to a practical plasma arrester. More particularly, the present invention relates to a practical plasma arrester in which an device for amplifying and slowly releasing the balancing charge is used.

BACKGROUND OF THE INVENTION

The plasma lightningproof technology is a technology in which the plasma atmospheric layer is polarized by the lightning effect, and the induced charge on the surface of the object to be protected is balanced out or weakened, so that the object can be protected from lightning strike. The main structure is a conductive ball. The lower portion of the conductive ball is connected to an input of a charge amplifier, and the output of the amplifier is connected to the surface of the object to be protected through a wire. The underlying operating principle is: when the plasma gas is polarized by the electric field caused by the lightning precursor charge, the charge, which has the same polarity with that of the precursor charge, enters into a charge amplifier from the conductive ball covered by the plasma, then further into the surface of the object to be protected, so as to balance out or weaken the induced charge on the surface of the object to be protected, therefore the atmosphere electric field on the surface of the object to be protected decreases in intensity, so that the electric field intensity can not rise to a value at which the atmosphere can be broken through, consequently the object to be protected can be protected from lightning strike.

A charge amplifier is provided to enhance the protection ability of the conductor covered by the plasma, so as to better protect the object which is not covered by plasma.

When the lightning precursor charge develops to a lightning strike level, the induced charge is produced, and the balancing charge is produced, then the balancing charge flows into the surface of the object to be protected, and the period of the above whole process is very short, typically at the order of microsecond, but the danger period of suffering from lightning strike is much longer, typically at the order of 10□100 microsecond, therefore during the lightning strike, the balancing charge for eliminating the lightning strike would disappear quickly, but at this time, the danger period has not finished yet, in other words, the possibility of suffering lightning strike still exists. Thus there is a need for the balancing charge to stay on the surface of the object to be protected for a longer time.

Further, there is also a need to modify the said charge amplifier so that it can be put into practical use for some special purpose.

OBJECTIVE OF THE INVENTION

The objective of the present invention is to provide a practical plasma arrester wherein an device for amplifying and slowly releasing the balancing charge is used. The plasma arrester of the present invention ensure that there is enough balancing charge to balance out the induced charge on the surface of the object to be protected, so that the objet can be protected completely from lightning strike.

SUMMARY OF THE INVENTION

A practical plasma arrester in accordance with the present invention includes: a plasma, a conductor, a charge amplifier, a wire, characterized in that a practical charge amplifier and a charging-discharging circuit are respectively connected in series with the conductor covered by the plasma and the wire connected with the surface of an object to be protected, the said amplifier is arranged to enhance the protection ability of the conductor covered by the plasma so as to better protect the object which is not covered by plasma, the said charging-discharging circuit firstly stores the balancing charge after the balancing charge is amplified, then releases (i.e. discharges) the balancing charge slowly, so that the stay period of the balancing charge on the surface of the object to be protected can be extended.

DETAILED DESCRIPTION OF THE INVENTION

Figure 1:
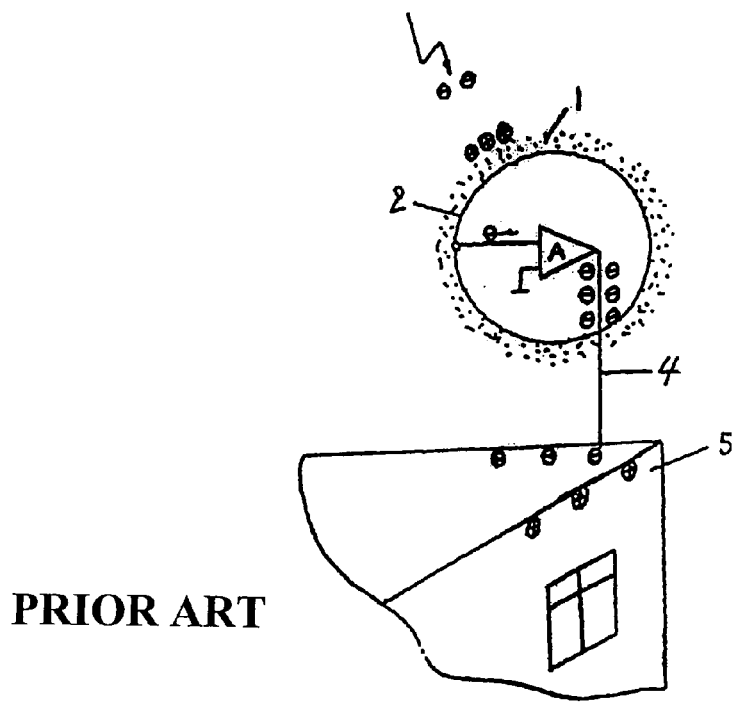
FIG. 1 is a schematic view of the plasma arrester in the prior art.

The practical plasma arrester in accordance with the present invention comprises, a plasma, a conductor, a charge amplifier, and a wire, characterized in that a practical charge amplifier and a charging-discharging circuit are respectively connected in series with the conductor covered by the plasma and the wire connected with the surface of an object to be protected, the said amplifier is arranged to enhance the protection ability of the conductor covered by the plasma so as to better protect the object which is not covered by plasma, the said charging-discharging circuit firstly stores a balancing charge after the balancing charge is amplified, then releases the balancing charge slowly, so that the stay period of the balancing charge on the surface of the object to be protected is desirably prolonged.

According to the practical plasma arrester of the invention, the said charge amplifier includes a DC charging capacitor C1 for storing energy, switch amplifiers, a device for polarity identifying and separating, a high-frequency transformer, wherein the balancing charge is connected to the input of the device for polarity identifying and separating, one end of the output of the said device is connected to the input of one switch amplifier, and another end of the output of the said device is connected to the input of another switch amplifier, the outputs of the two switch amplifiers are respectively connected to the two primary ends of the high-frequency transformer, the secondary ends of the high-frequency transformer are connected to the input of the charging-discharging circuit, the DC power supply supplies charges the capacitor to a rated value and supplies power for the switch amplifiers via the central point between the two primary ends.

According to the practical plasma arrester of the invention, the device for polarity identifying and separating causes the inputting charge pulses with different polarity to flow into different switch amplifier; the said switch amplifiers may be opened or closed, and the outputting amplitude of the switch amplifiers is proportional to the pulse amplitude of the inputting current pulse; the said DC power supply has small electric current and high voltage, it can charge the capacitor C1 to a rated value, typically at the level of 1 kV; the said high-frequency transformer can raise the voltage that the amplifiers can take on, typically at the level of 1 Kv, to a voltage of the charging-discharging circuit which is desired by the user, typically at the level of 10–100 kV.

According to the practical plasma arrester of the invention, the said switch amplifiers are electronic switches, the period of opening is proportional to the amplitude of the inputting electric current.

According to the practical plasma arrester of the invention, the said charging-discharging circuit is a device for slowly releasing charge, and includes a resistor R and a capacitor C2 which is connected in parallel with the secondary ends of the frequency transformer, one end of the capacitor C2 is connected with the one end of the resistor R, the other end of the capacitor C2 is grounded, the other end of the resistor R is connected with the surface of the object to be protected.

According to the practical plasma arrester of the invention, the said charging-discharging circuit is a device for slowly releasing charge, and includes three resistors and two capacitors, wherein a capacitor C2 is connected in parallel with the secondary ends of the frequency transformer, one end of the capacitor C2 is connected with the one end of a resistor R1, the other end of the capacitor C2 is grounded, the other end of the resistor R1 is connected with the surface of the object to be protected via a resistor R3 and a circuit with a resistor R2 and a capacitor C3 connected each other in parallel.

According to the practical plasma arrester of the invention, the said charge amplifier may be omitted when the object to be protected is small, in other words, the conductor covered by the plasma is directly connected with the charging-discharging circuit. The invention will be described in more detail with reference to the drawings.

The FIG. 1 is a schematic view of the plasma arrester in the prior art. As illustrated in FIG. 1, the precursor charge of the lightning strike is negative charge, the plasma 1 is polarized, the charge on the outer surface of the plasma is positive charge, and the charge inside of the plasma is negative charge, the negative charge enters into the conductor so as to balance out the induced positive charge therein. The charge which has the same polarity with the said precursor charge enters into the charge amplifier A to be amplified, then flows to the surface of the object 5 to be protected through a wire 4 so as to balance out the induced positive charge therein. Whereas the positive charge on the surface of the plasma disappears into the atmosphere. Because the induced charge on the surface to be protected is balanced out or weakened, the electric field intensity on the surface of the object to be protected is decreased, so that the said electric field intensity can not reach the degree where the breakthrough would take place, as a result, the object to be protected can be protected from lightning strike. Amplifier A connected with the wire 4 in series is designed to increase the balancing charge.

Figure 2:
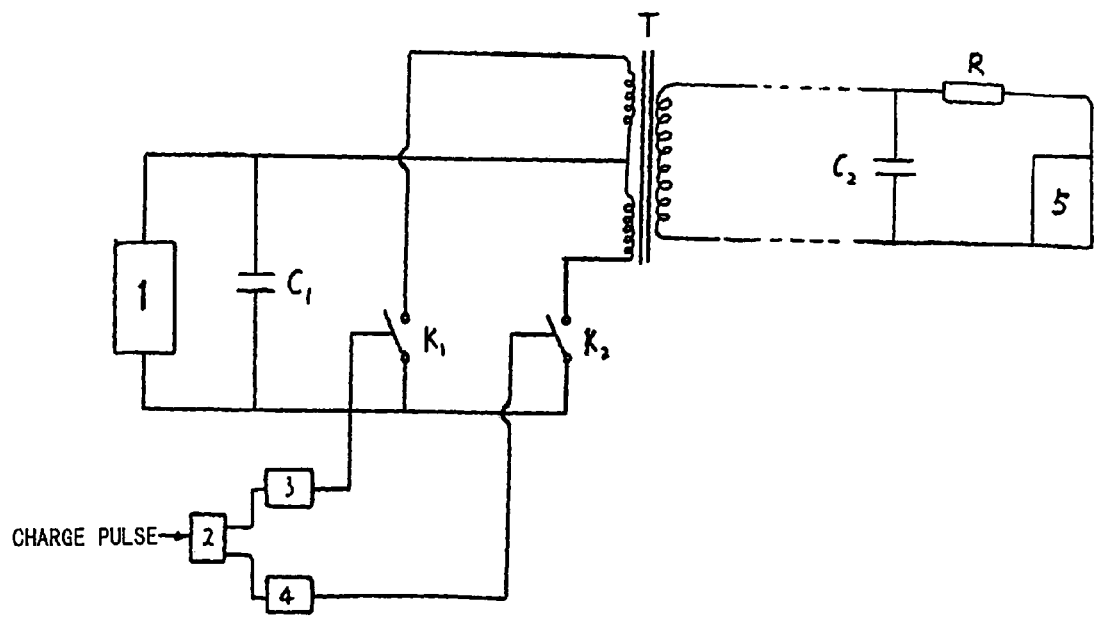
FIG. 2 is a diagram of the charge amplifier in the plasma arrester in accordance with the present invention.

The FIG. 2 is a diagram of the charge amplifier A which is used to enhance the protecting ability against lightning. The capacitor C1, which used to store energy, is charged to enough high voltage by the DC electric power, then the capacitor can be used as the electric power of the switch amplifiers K1, K2. The inputting charge pulse flows through the device 2 for polarity identifying and separating, then flows through the actuator 3 or 4 depending on the different polarity, therefore actuates the switch amplifier K1 or K2, after the charge is amplified the charge pulse flows to the high-frequency transformer T so as to lift the voltage.

Figure 3:
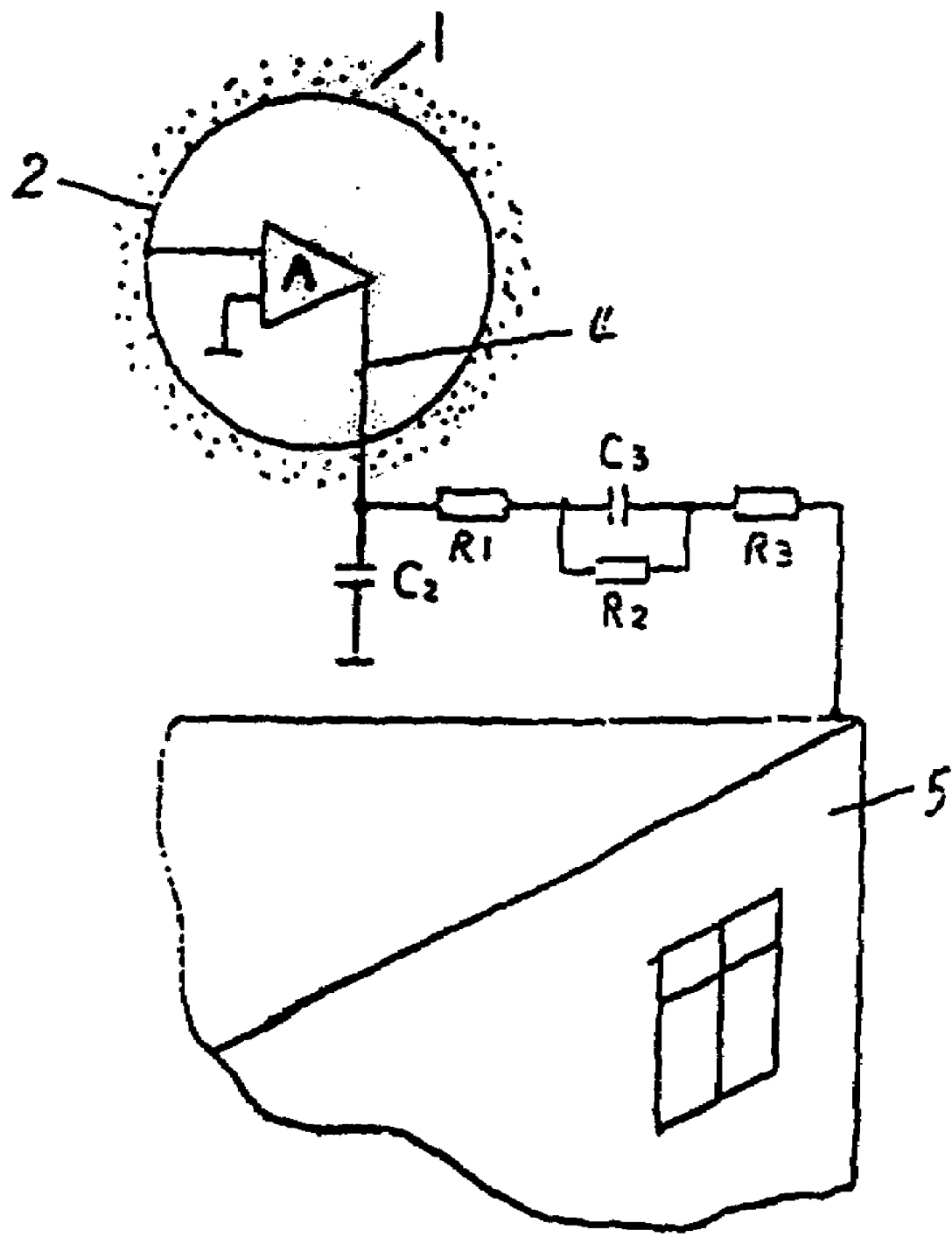
FIG. 3 is schematic view of the plasma arrester in accordance with the present invention wherein an device for slowly releasing the charge is appended.

The FIG. 3 is the schematic view of the practical plasma arrester in accordance with the present invention wherein the device B for slowly releasing charge is used. As illustrated in the figure, as soon as the lightning strike precursor charge reach the lightning strike level, the capacitor C2 stores the balancing charge which is conducted from the wire 4, after the balancing charge disappears, the capacitor C2 can continue to release the charge to the surface of the object 5 to be protected through the resistor R1, capacitor C3//resistor R2, resistor R3, so it can ensure that there is enough balancing charge during the danger period of lightning strike, therefore the object 5 to be protected can be protected from lightning strike. The function of the capacitor C3 is to ensure that the surface of the object 5 to be protected can be covered by the balancing charge at the beginning of releasing charge.

The values of the respective elements in the present embodiment are as follows: C1=5 µF, C2=0.1 µF, C3=2000 PF, R1=R3=1 KΩ, R2=10 KΩ, R=10 KΩ.

In the practical plasma arrester of the present invention, the conductor 2 covered by the plasma and the surface of the object 5 to be protected are respectively connected with the charge amplifier A and the device B for slowly releasing charge, therefore, the balancing charge can be stored after being amplified at the preliminary period of the lightning strike precursor charge reaching the lightning strike level, then the stored balancing charge is released slowly, in this way, the releasing period of the balancing charge can be longer than the dangerous period of the lightning strike.

In addition, the said charge amplifier A can be omitted when the object 5 to be protected is small, in other words, the conductor 2 covered by the plasma is directly connected with the device B for slowly releasing charge.

In the practical plasma arrester in accordance with the present invention, because the said charge amplifier A and the device B for slowly releasing charge are used, when the lightning occurs, the balancing charge, which has the opposite polarity, is induced by the precursor charge, and the balancing charge flows into the device B for slowly releasing charge, and cause the capacitor connected in parallel be charged immediately, after the balancing current disappears, the charged capacitor supplies the balancing charge to the object to be protected through the resistor connected in series, the period of the releasing charge can be controlled to a desired length by appropriately selecting the values of the capacitors and the resistors. Therefore, the plasma arrester of the present invention can completely prevent the occurring of the lightning strike.

The practical plasma arrester of the present invention can widely be used in various occasions where an arrester is needed to prevent lightning strike.

The invention claimed is:

1. A practical plasma arrester, comprising:
    a plasma,
    a conductor,
    a practical charge amplifier, and
    a wire,
    wherein the practical charge amplifier and a charging-discharging circuit are respectively connected in series with the conductor covered by the plasma and the wire connected with a surface of an object to be protected, the amplifier is arranged to enhance the protection ability of the conductor covered by the plasma so as to better protect the object which is not covered by the plasma, and the charging-discharging circuit firstly stores a balancing charge after the balancing charge is amplified, then releases the balancing charge slowly, so that a stay period of the balancing charge on the surface of the object to be protected is desirably prolonged.

2. The practical plasma arrester of claim 1, wherein the charge amplifier includes a DC charging capacitor C1 for storing energy, switch amplifiers, a device for polarity identifying and separating, and a high-frequency transformer, wherein the balancing charge is connected to an input of the device for polarity identifying and separating, one end of the output of the device is connected to the input of one switch amplifier, and another end of the output of the said device is connected to the input of another switch amplifier, the outputs of the two switch amplifiers are respectively connected to the two primary ends of the high-frequency transformer, and the secondary ends of the high-frequency transformer are connected to the input of the charging-discharging circuit, wherein a DC power supply supplies charges the capacitor to a rated value and supplies power for the switch amplifiers via the central point between the two primary ends.

3. The practical plasma arrester of claim 2, wherein the device for polarity identifying and separating causes the inputting charge pulses with different polarity to flow into different switch amplifiers;

the switch amplifiers may be opened or closed, and outputting amplitude of the switch amplifiers is proportional to the pulse amplitude of the inputting current pulse;

wherein the DC power supply has a small electric current and a high voltage, and is capable of charging the capacitor C1 to a rated value, typically at the level of 1 kV; and wherein the said high-frequency transformer can raise the voltage that the amplifiers can take on, typically at the level of 1 Kv, to a voltage of the charging-discharging circuit which is desired by the user, typically at the level of 10–100 kV.

4. The practical plasma arrester of claim 2, wherein the switch amplifiers are electronic switches, and the period of opening is proportional to the amplitude of the inputting electric current.

5. The practical plasma arrester of claim 1, wherein the said charging-discharging circuit is a device for slowly releasing charge, and includes a resistor (R) and a capacitor (C2) which are connected in parallel with the secondary ends of the frequency transformer, one end of the capacitor (C2) is connected with the one end of the resistor (R), the other end of the capacitor (C2) is grounded, and the other end of the resistor (R) is connected with the surface of the object to be protected.

6. The practical plasma arrester of claim 1, wherein the said charging-discharging circuit is a device for slowly releasing charge, and includes three resistors and two capacitors, wherein a capacitor (C2) is connected in parallel with secondary ends of the frequency transformer, one end of the capacitor (C2) is connected with the one end of a resistor (R1), the other end of the capacitor (C2) is grounded, and the other end of the resistor (R1) is connected with the surface of the object to be protected via a resistor (R3) and a circuit with a resistor (R2) and a capacitor (C3) connected each other in parallel.

7. The practical plasma arrester of claim 1, wherein the said charge amplifier may be omitted when the object to be protected is small, in which case the conductor covered by the plasma is directly connected with the charging-discharging circuit.

* * * * *

UNITED STATES PATENT AND TRADEMARK OFFICE
CERTIFICATE OF CORRECTION

| | | |
|---|---|---|
| PATENT NO. | : 7,113,382 B2 | Page 1 of 1 |
| APPLICATION NO. | : 10/451950 | |
| DATED | : September 26, 2006 | |
| INVENTOR(S) | : Zhang | |

It is certified that error appears in the above-identified patent and that said Letters Patent is hereby corrected as shown below:

On the Title page, item (54) after "Plasma" delete "Arrester" and insert therefor --Rejector--.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,113,382 B2  Page 1 of 1
APPLICATION NO. : 10/451950
DATED : September 26, 2006
INVENTOR(S) : Zhang It is certified that error appears in the above-identified patent and that said Letters Patent is hereby corrected as shown below:

On the Title page, item (54) and at Column 1, line 1, in the title, after "Plasma" delete "Arrester" and insert therefor --Rejector--.

This certificate supersedes the Certificate of Correction issued October 26, 2010.

Signed and Sealed this

Twenty-third Day of November, 2010

David J. Kappos
*Director of the United States Patent and Trademark Office*